United States Patent
Kobayashi et al.

(10) Patent No.: US 10,073,180 B2
(45) Date of Patent: Sep. 11, 2018

(54) RADIATION IMAGING APPARATUS AND RADIATION IMAGING SYSTEM

(71) Applicant: CANON KABUSHIKI KAISHA, Tokyo (JP)

(72) Inventors: Masaaki Kobayashi, Shimotsuke (JP); Kensuke Kobayashi, Tokyo (JP); Youjirou Hiratsuka, Yokohama (JP); Ryo Suzaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/072,487

(22) Filed: Mar. 17, 2016

(65) Prior Publication Data

US 2016/0282482 A1     Sep. 29, 2016

(30) Foreign Application Priority Data

Mar. 24, 2015 (JP) ................................. 2015-061662

(51) Int. Cl.
*G01T 1/16* (2006.01)
*G01T 1/20* (2006.01)
*G01T 7/00* (2006.01)

(52) U.S. Cl.
CPC .......... *G01T 1/2006* (2013.01); *G01T 1/2018* (2013.01); *G01T 7/00* (2013.01)

(58) Field of Classification Search
CPC ..... G01T 1/642; G01T 1/1644; G01T 1/2018; G01T 1/20; G01T 1/204
See application file for complete search history.

(56) References Cited

U.S. PATENT DOCUMENTS

| | | | | |
|---|---|---|---|---|
| 7,202,481 B2* | 4/2007 | Spahn | ...................... | A61B 6/00 |
| | | | | 250/370.09 |
| 7,947,960 B2* | 5/2011 | Wu | ...................... | A61B 6/4233 |
| | | | | 250/370.09 |
| 8,415,649 B2 | 4/2013 | Kobayashi | .................... | 250/581 |
| 8,604,434 B2 | 12/2013 | Kobayashi | ................. | 250/336.1 |

(Continued)

FOREIGN PATENT DOCUMENTS

| | | |
|---|---|---|
| JP | 2002-181943 | 6/2002 |
| JP | 3333278 | 10/2002 |
| JP | 2014-002114 | 1/2014 |

OTHER PUBLICATIONS

U.S. Appl. No. 15/046,605, filed Feb. 18, 2016, 2884.

*Primary Examiner* — David Porta
*Assistant Examiner* — Mamadou Faye
(74) *Attorney, Agent, or Firm* — Fitzpatrick Cella Harper and Scinto

(57) ABSTRACT

A radiation imaging apparatus includes a housing having a first plate portion and a second plate portion which oppose each other, a sensor panel arranged between the first plate portion and the second plate portion, and having a sensor array in which a plurality of sensors are arrayed, a scintillator arranged between the sensor panel and the second plate portion, a supporting portion arranged between the scintillator and the second plate portion, and configured to support the scintillator, and a buffer portion arranged between the sensor panel and the first plate portion. In orthographic projection to the first plate portion, an inner edge of the buffer portion is fitted between an outer edge of an imaging area of the sensor array and an outer edge of the scintillator.

20 Claims, 8 Drawing Sheets

(56) References Cited

U.S. PATENT DOCUMENTS

| | | | |
|---|---|---|---|
| 8,744,044 B2 | 6/2014 | Suwa et al. | 378/62 |
| 8,817,949 B2 | 8/2014 | Tsujii et al. | 378/95 |
| 8,901,505 B2 * | 12/2014 | Kobayashi | G01T 1/2018 250/369 |
| 2007/0272873 A1 * | 11/2007 | Jadrich | G01T 1/20 250/370.11 |
| 2008/0078940 A1 * | 4/2008 | Castleberry | G01T 1/2018 250/370.09 |
| 2008/0292059 A1 * | 11/2008 | Dobrusskin | G03B 42/04 378/167 |
| 2013/0134316 A1 * | 5/2013 | Nakatsugawa | G01T 1/202 250/366 |
| 2013/0140460 A1 | 6/2013 | Kobayashi | 250/336.1 |
| 2013/0341517 A1 | 12/2013 | Inoue et al. | 250/363.02 |
| 2014/0231662 A1 | 8/2014 | Kobayashi | 250/394 |
| 2014/0264061 A1 | 9/2014 | Watanabe et al. | 250/394 |
| 2015/0342553 A1 | 12/2015 | Sato et al. | A61B 6/5258 |

* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

There is known a radiation imaging apparatus for causing a scintillator to convert, into light, radiation which has been emitted from a radiation source and passed through an object and causing a sensor array having a plurality of arrayed sensors to detect the light, thereby obtaining an image. Radiation imaging apparatuses are classified into a type in which a scintillator is arranged between a radiation source and a sensor array and a type in which a sensor array is arranged between a radiation source and a scintillator. The latter type is described in Japanese Patent No. 3333278 and is excellent in high image quality and high detection efficiency of light converted by the scintillator.

Since the scintillator and the sensor array are fragile, it is important how they are supported in a housing. Japanese Patent Laid-Open No. 2014-2114 describes a radiation imaging apparatus including a housing having first and second plate portions arranged to oppose each other, a sensor panel arranged between the first and second plate portions, and a scintillator arranged between the sensor panel and the second plate portion. The sensor panel includes a sensor array in which a plurality of sensors for detecting light are arranged in an array. The radiation imaging apparatus includes a supporting portion arranged between the scintillator and the second plate portion so as to support the scintillator and a member arranged between the sensor panel and the first plate portion and made of a material having a buffer function of buffering a shock. The member is configured so that the outer edge of the sensor array is fitted into the outer edge of the member, thereby forming a space around the member.

In the arrangement in which the member having the buffer function is arranged between the first plate portion of the housing and the sensor array, as described in Japanese Patent Laid-Open No. 2014-2114, the member is required to have a sufficient radiation transmittance in addition to a sufficient buffer function for protecting the sensor array. For this reason, the degree of freedom of selecting a material for the member can be limited.

SUMMARY OF THE INVENTION

The present invention provides a radiation imaging apparatus advantageous in obtaining a high-quality radiation image free from a shock and load.

One of aspects of the present invention provides a radiation imaging apparatus comprising: a housing having a first plate portion and a second plate portion which oppose each other; a sensor panel arranged between the first plate portion and the second plate portion, and having a sensor array in which a plurality of sensors are arrayed; a scintillator arranged between the sensor panel and the second plate portion; a supporting portion arranged between the scintillator and the second plate portion, and configured to support the scintillator; and a buffer portion arranged between the sensor panel and the first plate portion, wherein in orthographic projection to the first plate portion, an inner edge of the buffer portion is fitted between an outer edge of an imaging area of the sensor array and an outer edge of the scintillator.

Further features of the present invention will become apparent from the following description of exemplary embodiments with reference to the attached drawings.

DESCRIPTION OF THE EMBODIMENTS

Exemplary embodiments of the present invention will be described below with reference to the attached drawings.

Figure 1:
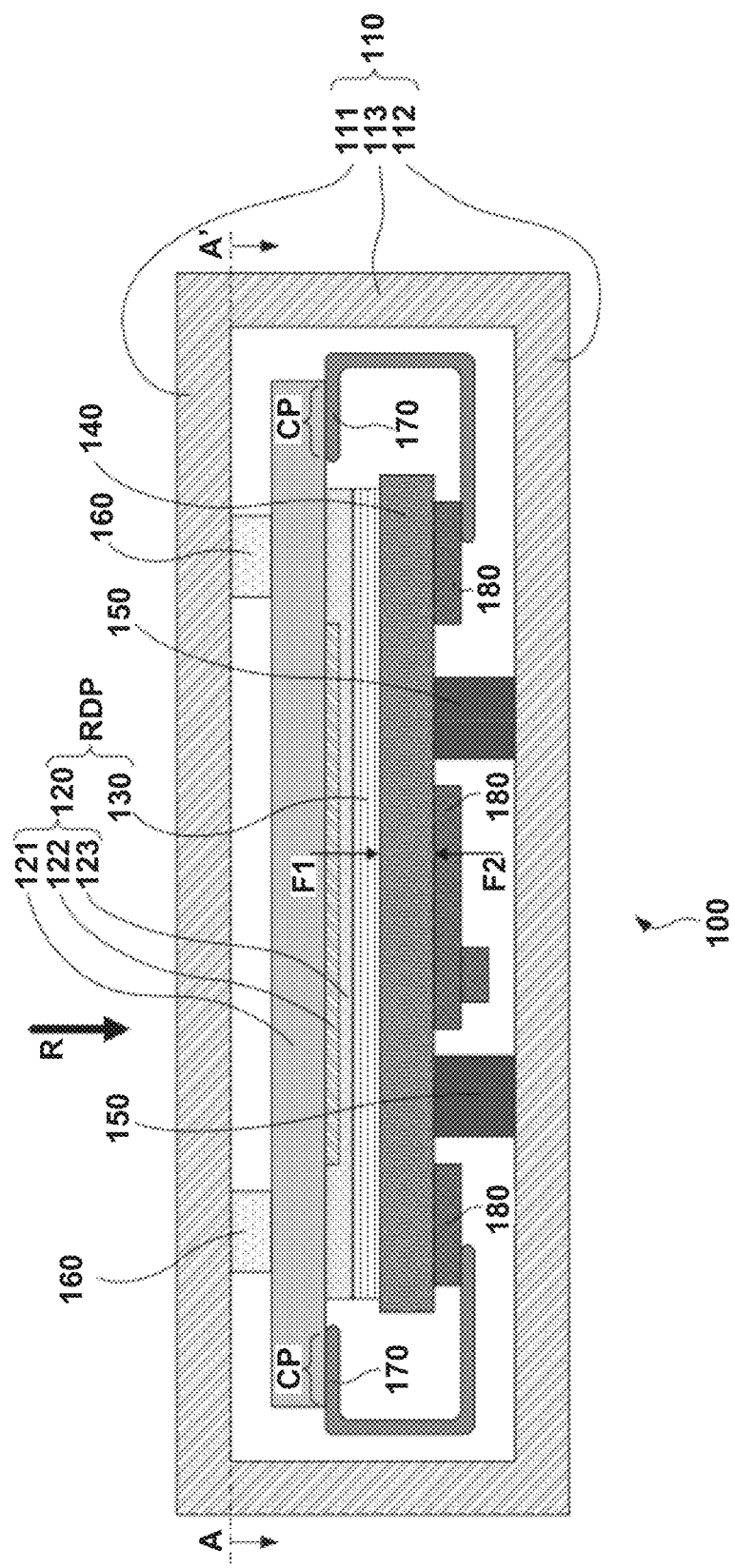
FIG. 1 is a schematic sectional view of a radiation imaging apparatus according to the first embodiment.
Figure 2:
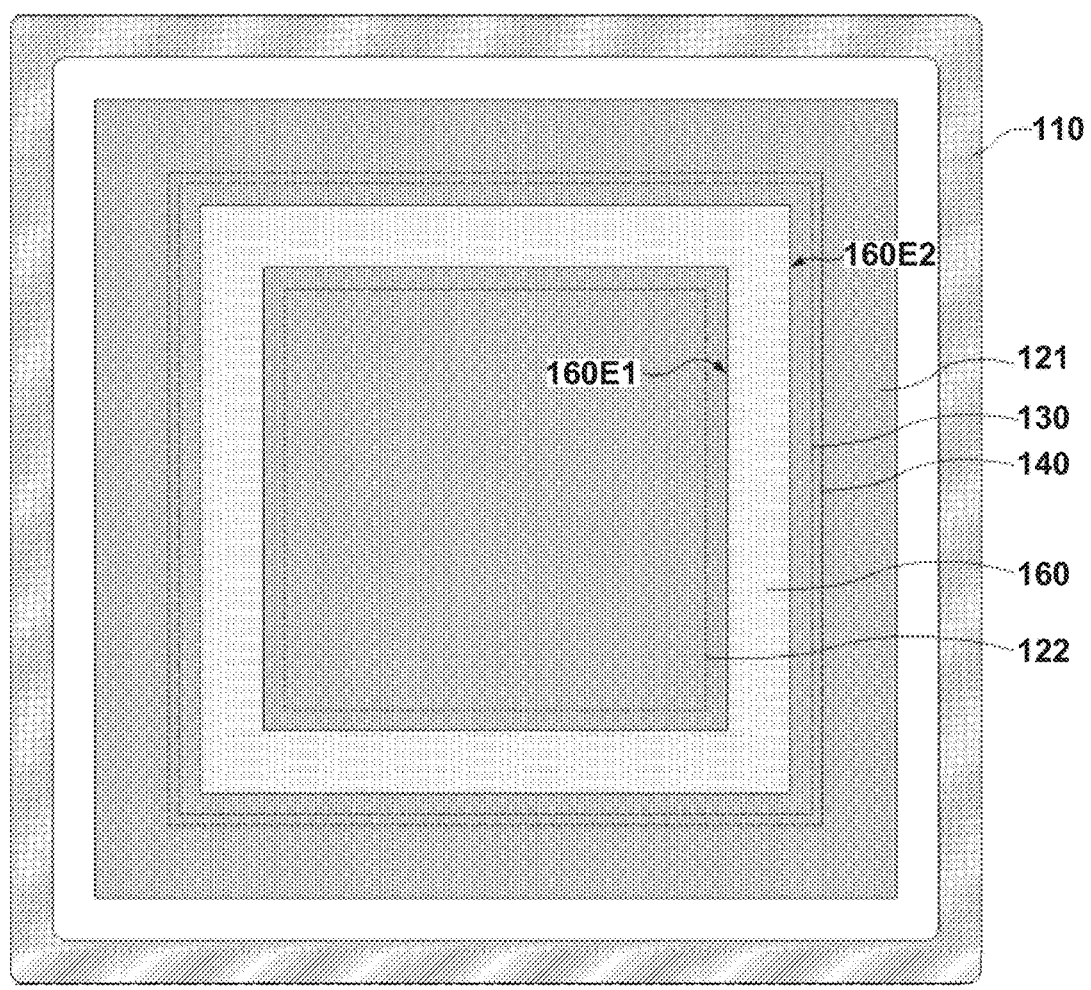
FIG. 2 is a schematic sectional view of the radiation imaging apparatus shown in FIG. 1 when viewed from a plane A-A' to an arrow direction.
Figure 3:
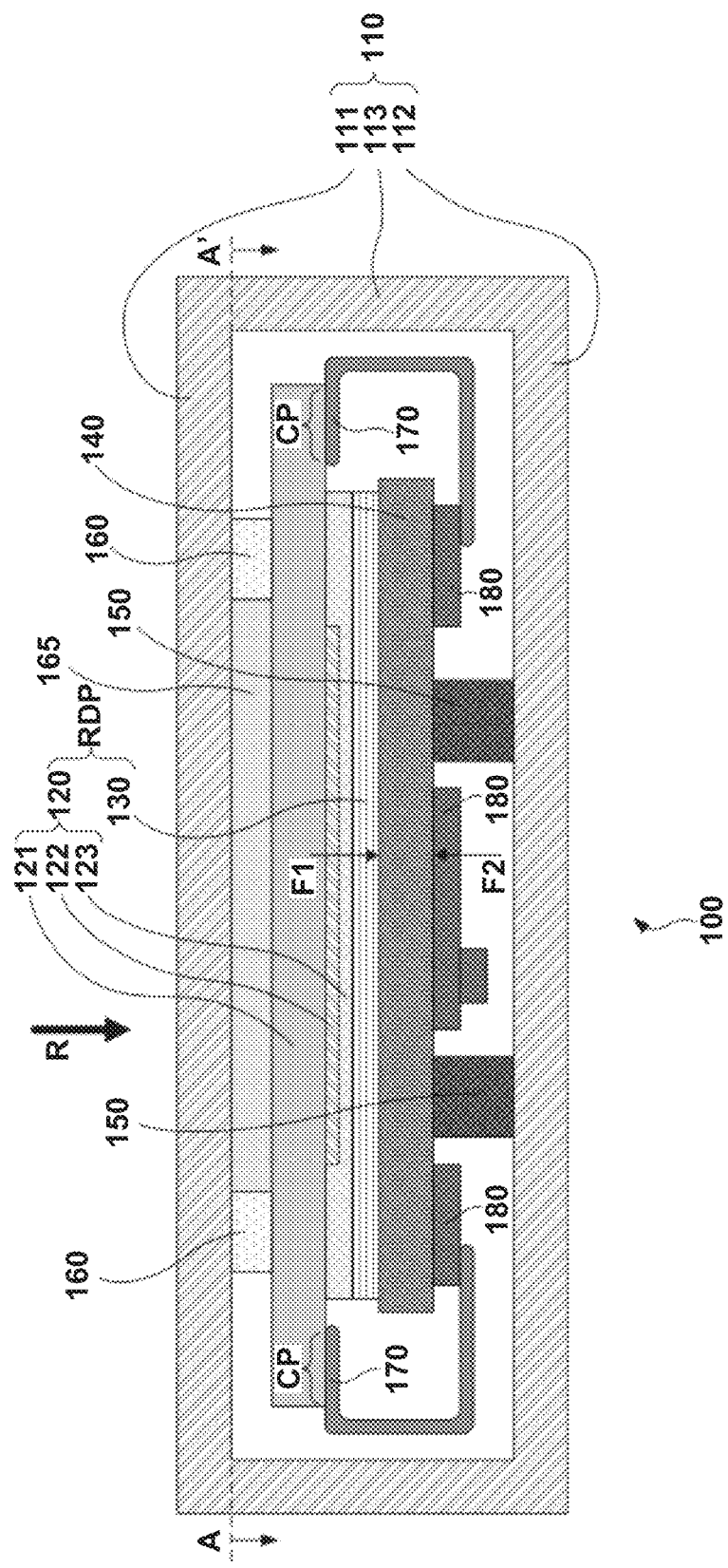
FIG. 3 is a schematic sectional view of a radiation imaging apparatus according to the first modification of the first embodiment.

FIG. 1 is a schematic sectional view of a radiation imaging apparatus 100 according to the first embodiment of the present invention. FIG. 2 is a schematic sectional view of the radiation imaging apparatus 100 shown in FIG. 1 when viewed from a plane A-A' to an arrow direction. As shown in FIG. 3, the radiation imaging apparatus 100 includes a housing 110, a sensor panel 120, a scintillator 130, a supporting portion 140, and a buffer portion 160. The housing 110 includes a first plate portion 111, a second plate portion 112, and a side portion 113. The first plate portion 111 and the second plate portion 112 are arranged to oppose each other and are coupled by a frame-shaped side portion 113. The housing 110 can have a plate-like shape as a whole. The scintillator 130 is arranged between the sensor panel 120 and the second plate portion 112. The scintillator 130 and the sensor panel 120 are adhered through an adhesion layer or may be in contact without being through the adhesion layer. The sensor panel 120 and the scintillator 130 constitute a radiation detection panel RDP. The supporting portion 140 is arranged between the scintillator 130 and the second plate portion 112 and supports the scintillator 130. The first plate portion 111 can be made of a material having a high radiation transmittance, for example, a resin such as CFRP. The housing 110 typically has a structure in which a portion on the side of the first plate portion 111 and a portion on the side of the second plate portion 112 can be divided.

The buffer portion 160 can be a frame-shaped buffer portion having a frame shape. Alternatively, the buffer portion 160 can be configured by a set of a plurality of separated buffer members. The buffer portion 160 may be configured by a material or member having repulsive elasticity or elongation such as foamed rubber. The buffer portion 160 is arranged between the sensor panel 120 and the first plate portion 111 to reduce the shock or load acting on the sensor panel 120 through the first plate portion 111. By arranging the buffer portion 160, the first plate portion 111 of the housing 110 and the sensor panel 120 can be reinforced with each other through the buffer portion 160. Therefore, the buffer portion 160 also plays a role of increasing the rigidity of the radiation imaging apparatus 100 or the housing 110. In addition, the buffer portion 160 can be arranged between the first plate portion 111 and the sensor panel 120 in a compressed state. This makes it possible to press the sensor panel 120 against the scintillator 130. This can prevent the sensor panel 120 from peeling from the scintillator 130 or the sensor panel 120 from deformation.

The sensor panel 120 includes a sensor array 122 in which a plurality of sensors (photoelectric converters) are arrayed. The sensor panel 120 includes a substrate 121. As an example, the substrate 121 can be made of an insulating substrate such as a glass substrate, and the sensor array 122 can be formed on the insulating substrate. As another example, the substrate 121 may be made of a semiconductor substrate, and all or some of the sensors constituting the sensor array 122 may be formed in the semiconductor substrate. The sensor panel 120 can have a protective film 123 which covers the sensor array 122.

As schematically shown in FIG. 2, in the orthographic projection to the first plate portion 111, an inner edge 160E1 of the buffer portion 160 is fitted into the outer edge of the imaging area of the sensor array 122 and the outer edge of the scintillator 130. When performing imaging using all the sensors constituting the sensor array 122, the outer edge of the sensor array 122 matches the outer edge of the imaging area. On the other hand, for example, when a light-shielded sensor for obtaining a reference signal exists in the peripheral portion of the sensor array 122 out of all the sensors constituting the sensor array 122, an area except for the reference sensor out of all the area of the sensor array 122 is defined as an imaging area.

With the above arrangement, the shock and load acting on the sensor panel 120 through the first plate portion 111 are reduced by the buffer portion 160. At the same time, peeling of the scintillator 130 from the sensor panel 120 and deformation of the sensor panel 120 and the scintillator 130 can be reduced. Attenuation of radiation in a path between the first plate portion 111 and the sensor array 122 can be suppressed. In addition, even if the buffer portion 160 is charged, its influence on a radiation image captured by the sensor panel 120 can be ignored. The material of the buffer portion 160 can be selected by prioritizing the function as the buffer member. Therefore, the radiation imaging apparatus 100 can be advantageously obtained to achieve strength against the shock and load and obtain a high-quality radiation image.

FIG. 3 shows the first modification of the radiation imaging apparatus 100 according to the first embodiment. As shown in FIG. 3, the radiation imaging apparatus 100 can further include an inner buffer portion 165 in the buffer portion 160. In this case, the radiation absorption rate of the inner buffer portion 165 should be lower than that of the buffer portion 160.

As schematically shown in FIG. 2, in the orthographic projection to the first plate portion 111, the outer edge of the scintillator 130 is fitted into the inside of the outer edge of the sensor panel 120 (more specifically, the substrate 121). That is, in the orthographic projection to the first plate portion 111, the peripheral portion of the sensor panel 120 (more specifically, the substrate 121) projects outside the scintillator 130. As schematically shown in FIG. 2, in the orthographic projection to the first plate portion 111, an outer edge 160E2 of the buffer portion 160 is fitted into the inside of the outer edge of the scintillator 130. With this arrangement, a force for deforming the substrate 121 can be prevented from acting on the peripheral portion of the substrate 121 of the sensor panel 120 by the buffer portion 160.

Radiation R enters the first plate portion 111, passes through the first plate portion 111, further passes through the sensor panel 120, and enters the scintillator 130. The radiation having entered the scintillator 130 is converted into light (visible light) by the scintillator 130. This light enters the sensor array 122 of the sensor panel 120. The radiation R is rarely attenuated when passing through the sensor panel 120. In addition, the most of the radiation entering the sensor panel 120 can pass through the sensor panel 120 and enter the scintillator 130. The ratio of the radiation R converted into light by the scintillator 130 is higher at a position closer to the incident surface of the scintillator 130. The light converted from the radiation R near the incident surface of the scintillator 130 enters the sensor array 122 of the sensor panel 120 with little attenuation. The radiation imaging apparatus 100 of this type is advantageous in the high detection efficiency of light converted by the scintillator 130 and a good image quality such as sharpness.

The supporting portion 140 has a first surface F1 which supports the scintillator 130 and a second surface F2 opposite to the first surface F1. The first surface F1 can be, for example, a flat surface. The supporting portion 140 and the scintillator 130 (or the radiation detection panel RDP) can be coupled with an adhesive agent. The supporting portion 140 can be joined to the housing 110 (typically the second plate portion 112 of the housing) through a joint 150 or directly. The supporting portion 140 and the joint 150 can be joined by a fastening tool such as a bolt, an adhesive agent, or a pressure sensitive adhesive agent. The joint 150 and the housing 110 (typically, the second plate portion 112 of the housing 110) can be joined by a fastening tool such as a bolt, an adhesive agent, or a pressure sensitive adhesive agent. The supporting portion 140 can be made of, for example, a metal or resin.

An electric component 180 may be fixed to the second surface F2 of the supporting portion 140. The sensor panel 120 can include a connecting portion CP to which flexible printed circuits (FPC) 170 are connected. The electric component 180 can be connected to the connecting portion CP of the sensor panel 120 by the flexible printed circuit 170. The flexible printed circuit 170 can have a structure in which a semiconductor chip is mounted on a film portion, for example, a structure called a COF (Chip on Film) or TAB (Tape Automated Bonding). The flexible printed circuit 170 can be connected to electrodes arranged in the connecting portion CP of the sensor panel 120 by thermocompression. As an example, this connection is performed in a process in which the radiation detection panel RDP including the sensor panel 120 and the scintillator is formed. After that, the radiation detection panel and the supporting portion 140 are adhered to each other, and the resultant structure is built into the housing 110.

In the subsequent test process, however, a semiconductor chip and a thermocompressed portion may sometimes fail due to changes over time in a providing destination. In this case, the failed flexible printed circuit 170 must be replaced with a new flexible printed circuit 170. This work can preferably be performed in a state in which the radiation detection panel RDP is fixed to the supporting portion 140. As schematically shown in FIG. 2, in orthographic projection to the first plate portion 111, the connecting portion CP is preferably arranged outside the outer edge of the supporting portion 140. In other words, the connecting portion CP is preferably exposed. With this structure, after the radiation detection panel 106 and the supporting portion 140 are integrally removed from the housing 110, replacement of the flexible printed circuit 170 can be facilitated. In this case, the sensor panel 120 is not preferably joined to the first plate portion 111 through the buffer portion 160. In other words, it is preferable that the sensor panel 120 and the buffer portion 160 are not coupled and/or the buffer portion 160 and the first plate portion 111 are not joined.

Figure 4:
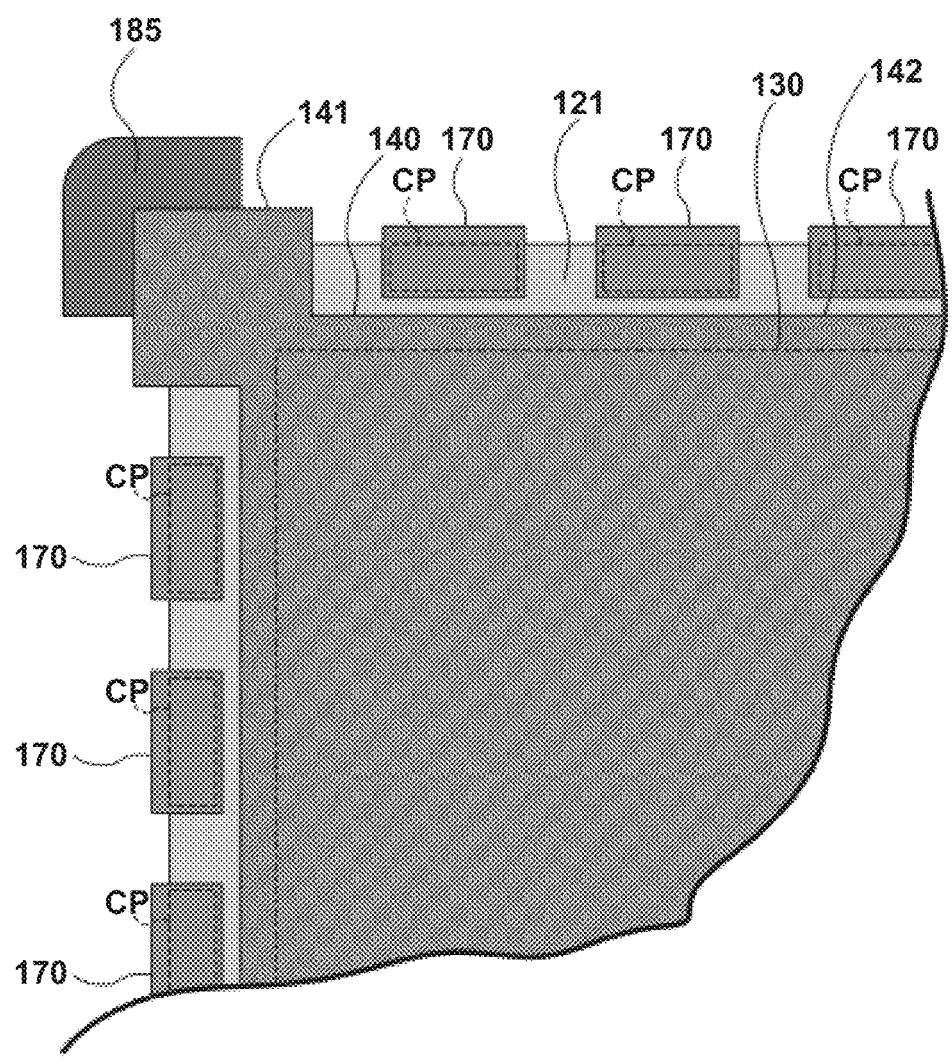
FIG. 4 is a schematic view showing the second modification of the first embodiment.
Figure 5:
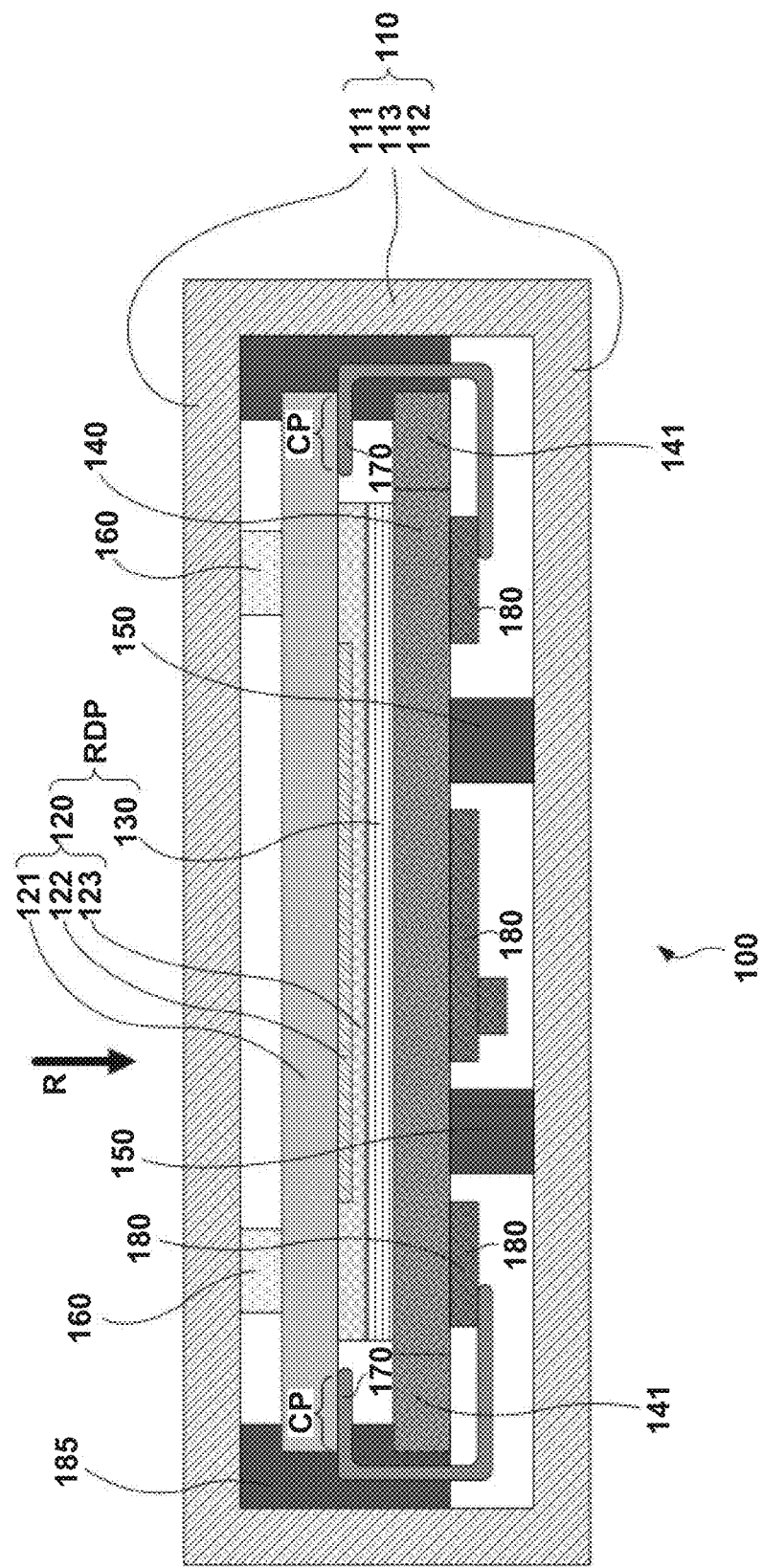
FIG. 5 is a schematic view showing the second modification of the first embodiment.

FIGS. 4 and 5 show the second modification of the radiation imaging apparatus 100 of the first embodiment. FIG. 4 is a view of the supporting portion 140 and the radiation detection panel RDP when viewed from the side of the supporting portion 140, and FIG. 5 is its sectional view. Even in this modification, the connecting portion CP is arranged outside the outer edge of the supporting portion 140, and the connecting portion CP is exposed. The supporting portion 140 can include a plurality of (typically four) corners 141 (only one corner is shown in FIG. 4) and an edge portion 142 located between two adjacent corner portions 141. In orthographic projection to the first plate portion 111, the plurality of corners 141 project outside the outer edge of the sensor panel 120 (substrate 121). The outer edge of an edge portion 142 of the supporting portion 140 is fitted into the outer edge of the sensor panel 120 (substrate 121). The radiation imaging apparatus 100 can include a plurality of spacers 185 between the corners 141 and the housing 110. The plurality of spacers 185 can align the supporting portion 140 with respect to the housing 110. The spacers 185 can define a distance between the first plate portion 111 and the supporting portion 140 of the housing 110. A structure in which the spacers 185 define the distance between the side portion 113 and the supporting portion 140 of the housing 110 is advantageous in defining a compression amount of the buffer portion 160 to be a predetermined amount. The spacers 185 can define the distance between the side portion 113 and the supporting portion 140 of the housing 110. The spacers 185 can function as guide members when assembling, into the housing 110, the structure including the radiation detection panel RDP and the supporting portion 140 attached with the spacers 185. More specifically, the structure including the supporting portion 140 and the radiation detection panel RDP can be inserted into the housing 110 while the spacers 185 are slid on the inner surface of the side portion 113 of the housing 110.

A structure in which the plurality of corners 141 project outside the outer edge of the sensor panel 120 (substrate 121) is advantageous in protecting the radiation detection panel RDP including the sensor panel 120 and the scintillator 130. In addition, a structure in which the spacers 185 are attached to the corners 141 is also advantageous in protecting the radiation detection panel RDP including the sensor panel 120 and the scintillator 130.

In addition, the end portions of the spacers 185 on the radiation incident side project from the radiation detection panel 106 and are in contact with the inner surface of the side portion 113 of the housing 110 in a state in which the structure is built into the housing 110. This makes it possible to determine the compression amount of the buffer portion 160 and keep a force (a restoration force generated by the buffer portion 160 by compressing the buffer portion 160) acting on the radiation detection panel 106 constant.

As described above, the first embodiment provides a radiation detection panel holding structure which suppresses an influence on an image without causing radiation absorption and charging. This structure is preferable in maintenance and assembly.

Figure 6:
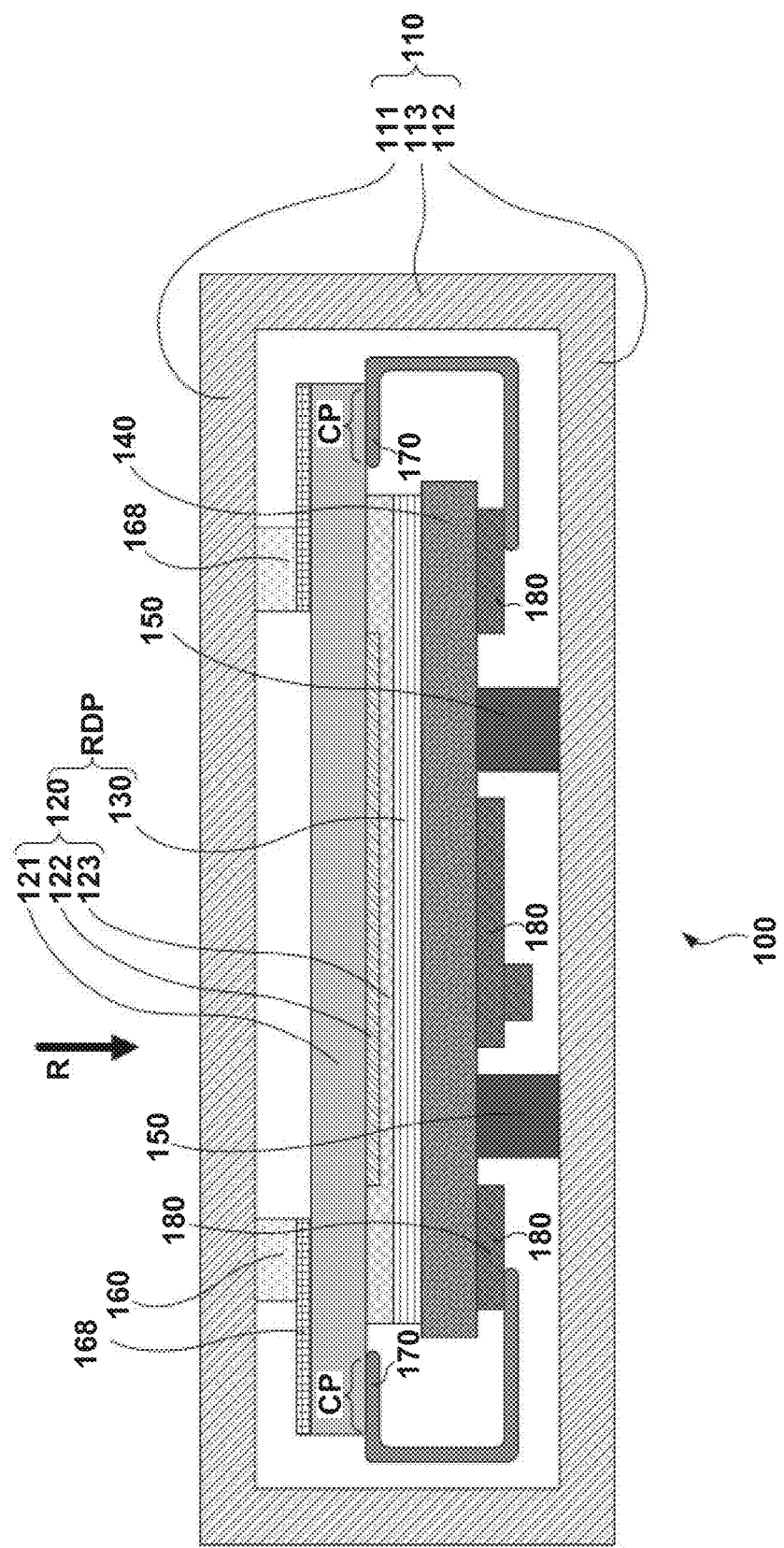
FIG. 6 is a schematic sectional view of a radiation imaging apparatus according to the second embodiment.

A radiation imaging apparatus 100 according to the second embodiment of the present invention will be described with reference to FIG. 6. Note that items not mentioned as the second embodiment can comply with the first embodiment. The radiation imaging apparatus 100 according to the second embodiment includes reinforcing portions 168 arranged between a sensor panel 120 and a buffer portion 160.

A substrate 121 of the sensor panel 120 is preferably made thin to reduce the attenuation of radiation R. When a glass substrate is employed as the substrate 121, a state-of-the-art glass substrate having a thickness of 0.1 mm can be used. When a thin glass substrate is used in this manner, it is important to protect the ends of the glass substrate. For this purpose, reinforcing portions 168 are preferably arranged so as to protect the end portions of the substrate 121. As a matter of course, when a substrate other than the glass substrate is employed as the substrate 121, the reinforcing portions 168 are advantageously arranged. In orthographic projection to a first plate portion 111, the imaging area of a sensor array 122 preferably is fitted into the inner edges of the reinforcing portions 168. The reinforcing portions 168 are coupled to the substrate 121 by, for example, an adhesive agent. The reinforcing portions 168 can be made of a material such as a resin, a metal, or glass. When the replacing operation of the flexible printed circuit 170 by thermocompression is considered, the reinforcing portions 168 are preferably made of a heat-resistant material. The buffer portion 160 is arranged between the reinforcing portions 168 and the first plate portion 111 of a housing 110.

In order to facilitate the maintenance operation, it is preferable that in the sensor panel 120, the reinforcing portions 168 and the buffer portion 160 are not coupled to each other, and/or the buffer portion 160 and the first plate portion 111 are not coupled to each other.

Figure 7:
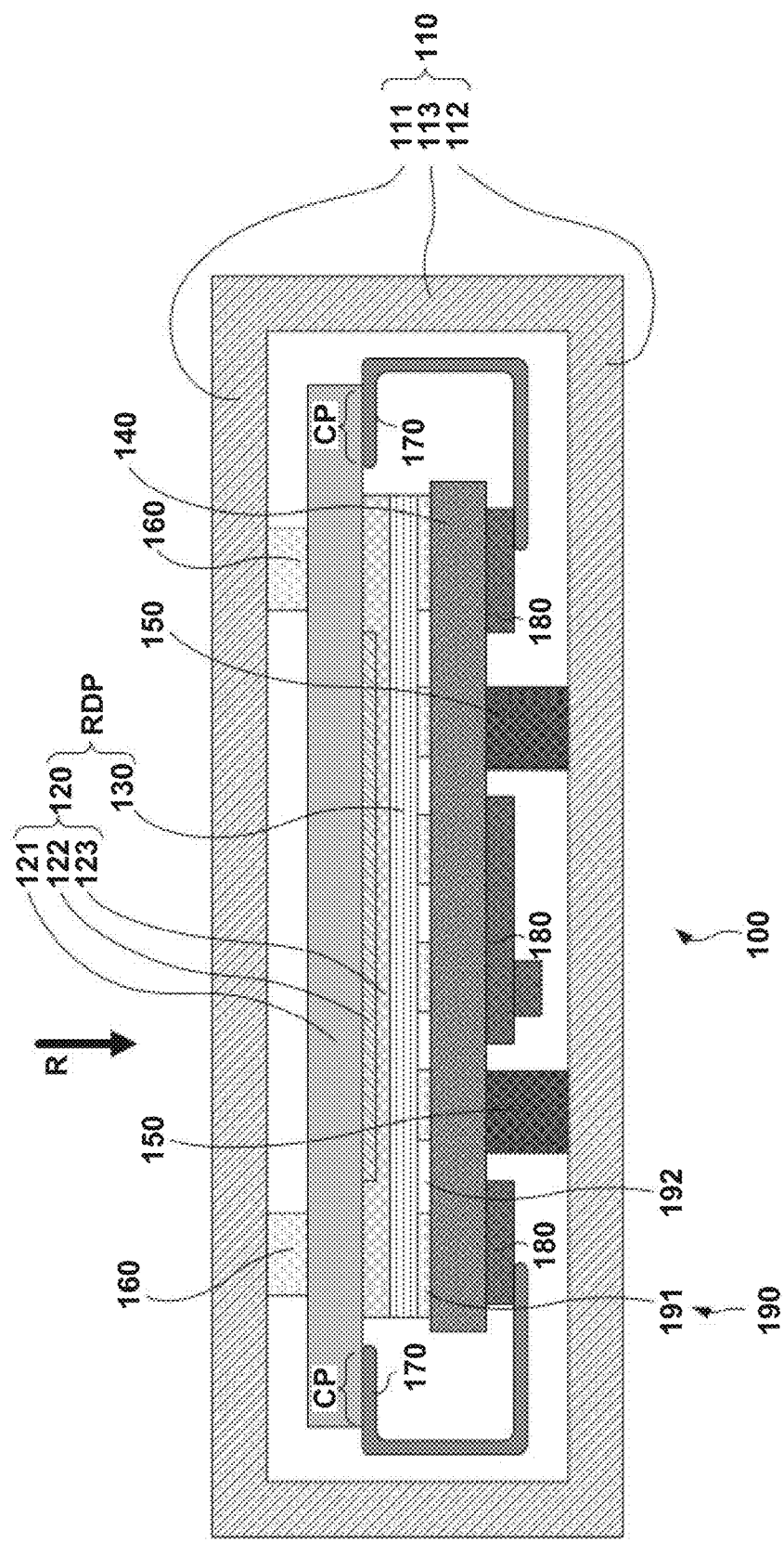
FIG. 7 is a schematic sectional view of a radiation imaging apparatus according to the third embodiment.

A radiation imaging apparatus 100 according to the third embodiment of the present invention will be described with reference to FIG. 7. Note that items not mentioned as the third embodiment can comply with the first or second embodiment. The radiation imaging apparatus 100 according to the third embodiment includes a buffer portion 190 arranged between a scintillator 130 and a supporting portion 140. By arranging the buffer portion 190, the shock and load acting on a sensor panel 120 can be reduced.

The buffer portion 190 includes, for example, a plurality of portions 191. Air layers 192 may be formed between the plurality of portions 191. The buffer portion 190 can be configured by a material or member having repulsive elasticity or elongation such as foamed rubber. The scintillator 130 and the buffer portion 190 can be adhered to each other using a pressure sensitive adhesive agent or an adhesive agent. In addition, the buffer portion 190 and the supporting portion 140 can be adhered to each other by an adhesive agent. At the time of capturing a radiation image, and particularly at the time of capturing a moving image, a decrease in image quality by heating should be suppressed. The output value (pixel value) of a radiation detection panel RDP can depend on the temperature of the radiation detection panel RDP. By forming the air layers 192, the air layers 192 can suppress transfer of heat generated by an electric component 180 to the radiation detection panel RDP. In order to suppress the deformation of the radiation detection panel RDP, in orthographic projection to a first plate portion 111, an area in which the buffer portion 190 or its portions 191 exists preferably includes an area of a buffer portion 160. The third embodiment includes the reinforcing portions 168 arranged between the sensor panel 120 and the buffer portion 160 as in the second embodiment.

Figure 8:
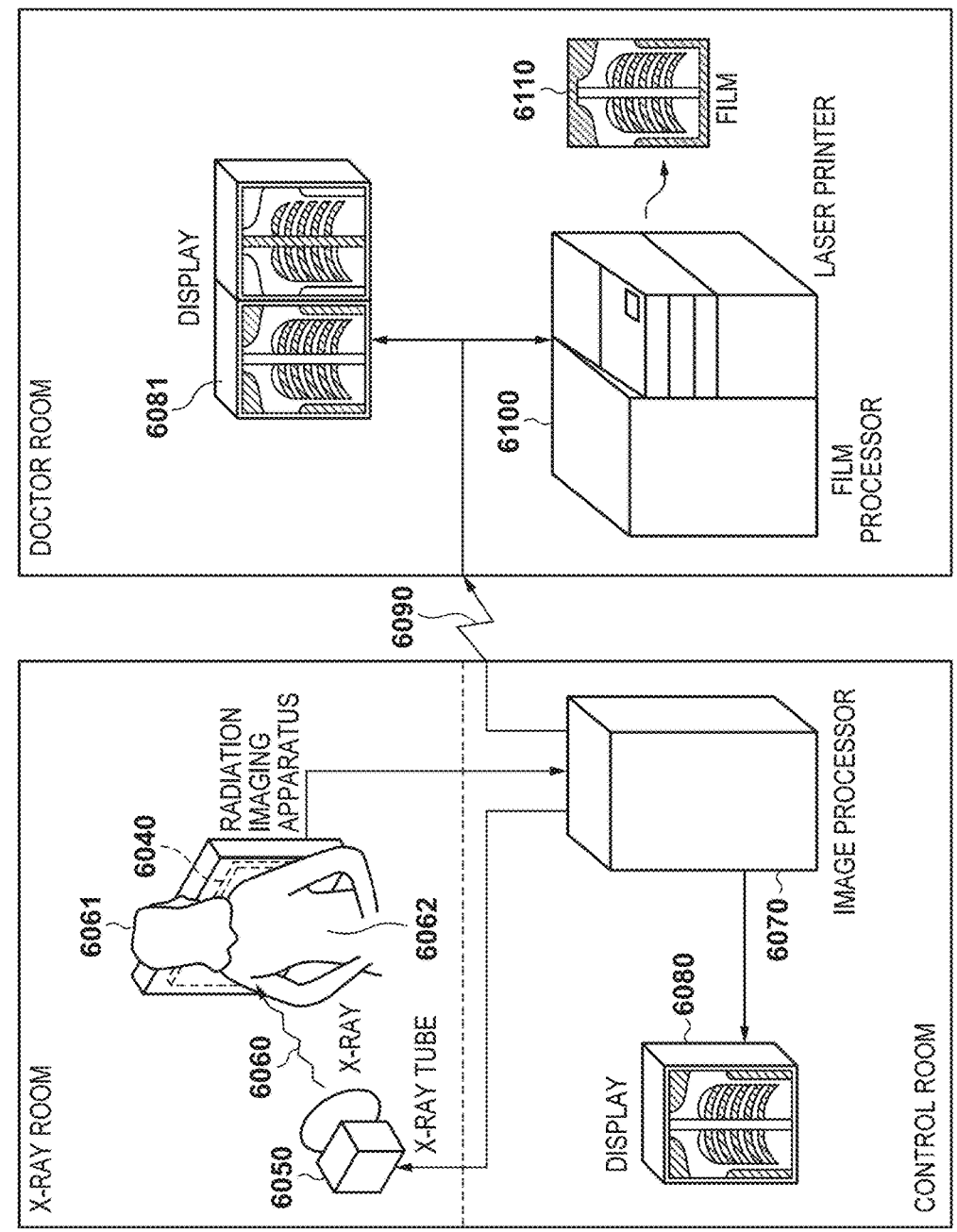
FIG. 8 is a view showing the arrangement of a radiation imaging system.

Next, a radiation imaging system will be described with reference to FIG. 8. This radiation imaging system includes an X-ray tube 6050 serving as a radiation source for generating radiation and a radiation imaging apparatus 6040 to which the radiation imaging apparatus 100 is applied.

X-rays 6060 emitted from the X-ray tube 6050 serving as a radiation source are transmitted through a chest portion 6062 of a patient or object 6061 and enter the radiation imaging apparatus 6040. The incident X-rays contain information of the interior of the patient or object 6061. The radiation imaging apparatus 6040 captures an image formed by the incident X-rays (radiation) and obtains a radiation image as electric information. This radiation image is processed by an image processor 6070 serving as an image processor and displayed on a display 6080 in a control room.

In addition, the radiation image can be transferred to a remote area by a transmission processor such as a telephone line 6090, displayed on a display 6081 arranged in a doctor room as another location, and stored in a recording unit such as an optical disk. A doctor in a remote area can diagnose the patient or object 6061 based on the radiation image. In addition, the radiation image can also be recorded on a film 6110 serving as a recording medium by a film processor 6100 serving a recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-061662, filed Mar. 24, 2015, which is hereby incorporated by reference herein in its entirety.

What is claimed is:

1. A radiation imaging apparatus comprising:
a housing having a first plate portion and a second plate portion that oppose each other;
a sensor panel arranged between the first plate portion and the second plate portion, providing a sensor array comprising a plurality of arrayed sensors;
a scintillator arranged between the sensor panel and the second plate portion;
a supporting portion arranged between the scintillator and the second plate portion, and configured to support the scintillator; and
a buffer portion arranged between the sensor panel and the first plate portion, wherein
an inner edge of the buffer portion is fitted between an outer edge of an imaging area of the sensor array and an outer edge of the scintillator in orthographic projection to the first plate portion.

2. The apparatus according to claim 1, wherein an outer edge of the buffer portion is fitted into the outer edge of the scintillator in the orthographic projection to the first plate portion.

3. The apparatus according to claim 1, wherein the outer edge of the scintillator is fitted into an outer edge of the sensor panel in the orthographic projection to the first plate portion.

4. The apparatus according to claim 1, wherein an outer edge of the imaging area of the sensor array is fitted within a region surrounded by the outer edge of the scintillator in the orthographic projection to the first plate portion.

5. The apparatus according to claim 1, wherein the sensor panel is not joined to the first plate portion through the buffer portion.

6. The apparatus according to claim 1, wherein
the supporting portion includes a plurality of corner portions and an edge portion positioned between two adjacent corner portions out of the plurality of corner portions,
the plurality of corner portions project outside an outer edge of the sensor panel in the orthographic projection to the first plate portion, and
an outer edge of the edge portion is fitted into the outer edge of the sensor panel in the orthographic projection to the first plate portion.

7. The apparatus according to claim 6, further comprising spacers arranged between the corners and the housing.

8. The apparatus according to claim 7, wherein the spacers define a distance between the first plate portion and the supporting portion.

9. The apparatus according to claim 1, wherein the sensor panel includes a connecting portion to which a flexible printed circuit is connected, and the connecting portion is located outside an outer edge of the supporting portion in the orthographic projection to the first plate portion.

10. The apparatus according to claim 9, wherein the supporting portion has a first surface which supports the scintillator and a second surface opposite to the first surface,
an electric component is fixed to the second surface, and
the connecting portion and the electric component are connected by the flexible printed circuit.

11. The apparatus according to claim 1, further comprising a reinforcing portion arranged between the sensor panel and the buffer portion.

12. The apparatus according to claim 1, further comprising a buffer portion arranged between the scintillator and the supporting portion.

13. The apparatus according to claim 12, wherein the buffer portion comprises a plurality of portions, with air layers between the plurality of portions.

14. The apparatus according to claim 1, further comprising an inner buffer portion inside the buffer portion, wherein
a radiation absorption rate of the inner buffer portion is lower than that of the buffer portion.

15. A radiation imaging system comprising a radiation source configured to generate radiation and a radiation imaging apparatus, the radiation imaging apparatus comprising:
a housing having a first plate portion and a second plate portion which oppose each other;
a sensor panel arranged between the first plate portion and the second plate portion, and having a sensor array in which a plurality of sensors are arrayed;
a scintillator arranged between the sensor panel and the second plate portion;
a supporting portion arranged between the scintillator and the second plate portion, and configured to support the scintillator; and
a buffer portion arranged between the sensor panel and the first plate portion, wherein
an inner edge of the buffer portion is fitted between an outer edge of an imaging area of the sensor array and an outer edge of the scintillator in orthographic projection to the first plate portion.

16. The apparatus according to claim 1, wherein the sensor panel is not coupled to the buffer portion.

17. The apparatus according to claim 1, wherein the buffer portion is not joined to the first plate portion.

18. The apparatus according to claim 1, wherein the buffer portion has a frame shape,
 the apparatus further comprises an inner buffer portion arranged in the buffer portion, and
 a radiation absorption rate of the inner buffer portion is lower than that of the buffer portion.

19. The apparatus according to claim 1, wherein the inner edge of the buffer portion surrounds the outer edge of the imaging area of the sensor array in the orthographic projection to the first plate portion.

20. The apparatus according to claim 1, wherein the buffer portion has a frame-shape,
 the inner edge of the buffer portion providing an inner-side edge of the frame shape, and
 the inner-side edge of the buffer portion surrounds the outer edge of the imaging area of the sensor array in orthographic projection to the first plate portion.

* * * * *